United States Patent [19]
Brooks et al.

[11] Patent Number: 5,492,192
[45] Date of Patent: Feb. 20, 1996

[54] ELECTRIC VEHICLE WITH TRACTION CONTROL

[75] Inventors: Loran D. Brooks, Birmingham; Kevin S. Kidston, New Hudson, both of Mich.

[73] Assignee: General Motors Corporation, Detroit, Mich.

[21] Appl. No.: 293,632

[22] Filed: Aug. 22, 1994

[51] Int. Cl.$^6$ .................................................. B60L 1/02
[52] U.S. Cl. ...................... 180/165; 180/197; 180/65.1; 180/65.3; 180/65.8; 303/3; 318/371; 364/424.01; 364/426.02
[58] Field of Search ....................... 180/165, 197, 180/65.2, 65.1, 65.3; 303/3, 20; 318/371; 364/426.02, 426.03, 424.01

[56] References Cited

U.S. PATENT DOCUMENTS

| | | | |
|---|---|---|---|
| 3,774,095 | 11/1973 | Coccia | 318/371 |
| 4,075,538 | 2/1978 | Plunkett | 318/52 |
| 5,090,511 | 2/1992 | Kabasin | 180/197 |
| 5,148,883 | 9/1992 | Tanaka et al. | 180/165 |
| 5,215,156 | 6/1993 | Stulbach et al. | 180/65.3 |
| 5,222,568 | 6/1993 | Higasa et al. | 180/65.5 |
| 5,265,693 | 11/1993 | Rees et al. | 180/197 |
| 5,322,352 | 6/1994 | Ohno et al. | 303/3 |
| 5,365,431 | 11/1994 | Minezawa et al. | 364/424.01 |

FOREIGN PATENT DOCUMENTS

| | | |
|---|---|---|
| 0427138 | 2/1990 | European Pat. Off. . |
| 839764 | 1/1980 | U.S.S.R. . |

*Primary Examiner*—Mitchell J. Hill
*Attorney, Agent, or Firm*—Anthony L. Simon

[57] ABSTRACT

A vehicle traction control system comprising an electric motor and drive system for an electric vehicle, at least one driven wheel mechanically connected to the electric motor and drive system, at least one non-driven wheel, and a controller coupled to the driven wheel, the non-driven wheel and the motor for controlling the motor and drive system to provide traction control for the vehicle by sensing a positive wheel slip between the driven and non-driven wheel, determining a control command responsive to the sensed slip, applying the control command to the motor and drive system to affect positive motor drive torque from the motor when the control command is less than an acceleration request, and applying the control command to the motor and drive system to affect regenerative braking when the control command is less than an acceleration request, wherein during regenerative braking, positive tractive force is provided by inertia of the motor and drive system, wherein the single control command controls both motor torque and braking during traction control.

3 Claims, 6 Drawing Sheets

ELECTRIC VEHICLE WITH TRACTION CONTROL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

This invention relates to electric vehicles and more particularly, electric vehicles with traction control and regenerative braking.

BACKGROUND OF THE INVENTION

Typically, electric vehicles drive electric motors based on electric power stored in batteries having a limited power storage capability.

Typically, vehicles with traction control systems control drive torque delivered by the vehicle drive wheels to limit the drive torque to an amount at which the vehicle drive wheels have traction on the driving surface. Or, in other words, the amount of available drive torque is limited by the coefficient of a friction between the drive wheels and the road. Thus, traction control systems have a motive force source such as a vehicle engine and seek, during traction control, to limit the output torque of the motive force source to a force that would drive the wheels without slip on the road surface. Some traction control systems include brake control which allows faster reduction of torque delivered by the drive wheels while positive torque is maintained from the motive force. The wheels must have positive torque to provide motive force and motor/transmission/brake controls are used to limit the amount of that torque.

In vehicles with traction control, it is known that it is desirable to detect the presence of a spare tire on the vehicle because the spare tire may be undersized and cause a wheel speed differential between that tire and other tires on the vehicle due to the different tire sizes. This wheel speed differential, if not accounted for in the traction control system may cause the vehicle to unnecessarily enter traction control mode, which will cause an undesirable loss of drive torque for the vehicle.

For example, the vehicle may accelerate normally until the vehicle hits a speed at which the wheel speed differential between the spare and the remaining tires causes traction control to turn on, at which time, drive torque will be reduced from the motor until the wheel speed differential is low enough to cause traction control to turn off. Thus, for example, the vehicle may speed up to a speed of 40–45 m.p.h. and then slow down due to motor torque reduction and/or traction control braking until the vehicle speed is 10–15 m.p.h., at which case, traction control will turn off and the vehicle will be allowed to speed up again until traction control turns on.

A known method for compensating for the spare tire is to determine the presence of a spare tire by monitoring the wheel speeds and determining if one wheel, in a normal operating condition, i.e., non-traction control and non-ABS, is spinning faster than the remaining wheels. If so, then it is determined that this wheel is an undersized spare tire and its wheel speed is normalized to match the other wheel speed. That is, a proportional constant between that wheel speed and the other wheel speeds is determined and multiplied by that wheel speed to normalize the resultant signal. The normalized signal is then used with the remaining signals to determine whether or not traction control should be activated and to determine the traction control command.

SUMMARY OF THE PRESENT INVENTION

Advantageously, this invention provides a new method and apparatus for providing traction control in a vehicle with regenerative energy capacity.

Advantageously, the method and apparatus of this invention are ideal for use on an electric vehicle with regenerative braking.

Advantageously, this invention provides a counter-intuitive approach to traction control which includes the elimination of an active positive drive force during portions of traction control. This is counter-intuitive because to achieve motive work from the vehicle previous traction control systems have maintained an active positive drive source, which is defined as a motor or internal combustion engine consuming fuel, either electricity from batteries or gasoline, to maintain at least a minimum drive torque. According to this invention, during portions of the traction control activation, there is no active positive drive source to the vehicle drive train.

Advantageously then, this invention comprises a vehicle with a source of motive force and a drive train coupled to at least one drive wheel of the vehicle wherein the source of motive force and the drive train are characterized by an inertia, a source of energy for the motor capable of delivering energy to the motor and therefore to the drive wheel and receiving energy during regenerative energy management and a traction control system utilizing drive train inertia for positive direction drive torque and the regenerative energy management to limit speed of at least one drive wheel during traction control wherein during activation of the traction control system and regenerative energy management, no drive torque is provided by the source of energy.

In a preferred implementation, this invention is used with an electric vehicle having a source of electric power, such as a battery pack, an electric drive motor, a drive train nondisengageably coupling the electric drive motor to at least one drive wheel and regenerative braking capability for transferring braking energy to the battery pack during regenerative braking wherein the electric motor and drive train are characterized by an inertia and wherein the system includes a traction control system utilizing motor and drive train inertia for positive direction drive torque and the regenerative braking to limit speed of at least one drive wheel during traction control wherein during activation of the traction control system and regenerative braking, no drive torque is provided by the electric motor to the drive wheel.

Advantageously then, the method of this invention for achieving the advantageous traction control set forth herein is set forth in a vehicle having an electric motor and drive train coupled to at least one drive wheel of the vehicle wherein the electric motor and drive train are characterized by an inertia, a source of power such as a battery pack for the electric motor capable of delivering power to the motor and receiving power during regenerative braking comprising the steps of: detecting a traction control condition; responsive to the detected condition, determining if a magnitude of the detected condition is above a limit value; if the magnitude of the detected condition is above the limit value, (i) cutting off power to the motor from the source of electric power, (ii) utilizing motor and drive train inertia as positive motive force for the drive wheel, and (iii) coupling the motor to the source of electric power so that rotational motion of the motor generates electric energy which is transferred to the source of power to achieve regenerative braking.

A more detailed description of this invention is set forth below.

DETAILED DESCRIPTION OF THE INVENTION

Figure 1:
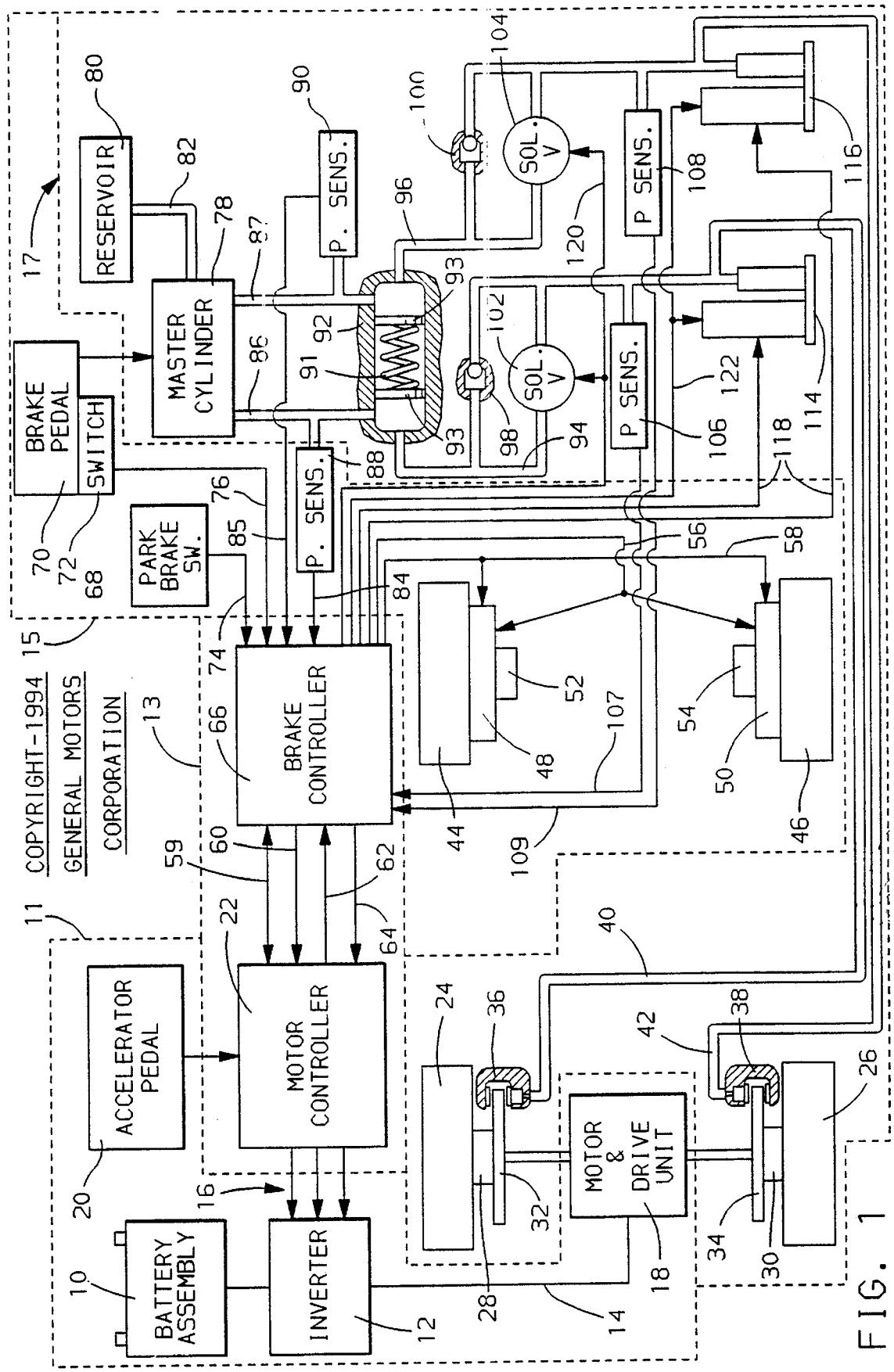
FIG. 1 illustrates schematically an electric vehicle according to this invention.

Referring to FIG. 1, an electric vehicle according to this invention comprises electric motor propulsion system 11, brake system 15 and control unit 13. The electric motor propulsion system 11 includes battery pack 10, inverter 12 (for use with AC motors), accelerator pedal 20 and electric motor and drive train 18. Brake system 15 includes brake pedal 70, hydraulic braking system 17 and electric drum brakes 48 and 50. Control unit 13 includes motor controller 22 for controlling the propulsion system 11 and brake controller 66 for controlling brake system 15.

In the propulsion system 11, battery pack 10 supplies power to the vehicle systems and power inverter 12 responds to motor controller 22 for controlling electric motor 18. Motor 18 provides both drive force to vehicle drive wheels 24 and 26 and regenerative braking by generating power, when commanded, and coupling the generated power to battery pack 10, providing braking torque to wheels 24 and 26. An example motor drive and recharge system, suitable for use as inverter 12 and motor 18 (assuming a three phase AC motor 18 is used), is set forth in U.S. Pat. No. 5,099,186, assigned to the assignee of this invention and having a disclosure that is incorporated herein by reference.

Accelerator pedal 20 provides an accelerator command to motor controller 22, which responsively controls inverter 12 via command line 16 to provide power to motor 18 and thereby provide motive drive force to drive wheels 24 and 26.

In brake system 15, hydraulic brake system 17 comprises master cylinder 78, hydraulic lines 40, 42, 86, 87, 94 and 96, accumulator 92, actuators 114 and 116, solenoid valves 102 and 104, brake calipers 36 and 38 and brake discs 32 and 34. Brake controller 66 responds to operator depression of brake pedal 70, providing brake information to motor controller 22 and controlling the hydraulic brake system, including solenoid valves 102 and 104, actuators 114 and 116, and electric rear brakes 48 and 50. Bypass valves 98 and 100 allow excess pressure from actuators 114 and 116 to flow to accumulator 92. Brake controller 66 also monitors the various rotational speeds of vehicle wheels 24, 26, 44 and 46 through speed sensors 28, 30, 52 and 54.

The battery pack 10 can be any battery pack or rechargeable electric power storage device suitable for use in an electric vehicle. Power inverter 12 is used when motor 18 is one or more AC motors. If one or more DC drive motors are used, power inverter 12 is not necessary and may be replaced with an appropriate DC motor controller of a type well known to those skilled in the art.

The motor drive unit 18 may be a single drive motor driving both wheels 24 and 26, may be two motors connected back-to-back driving wheels 24 and 26, or may be two or more motors with each motor incorporated into each wheel assembly. Additionally, the motors may be AC motors or DC motors, including one or more brushless DC motors. The drive train preferably comprises a reduction gear set coupled to the motor output shaft and driving the vehicle drive wheels. No clutches are necessary in the drive train as adequate performance has been achieved without the necessity of a gear shifting transmission and since, to reverse the vehicle, the motor direction may simply be reversed. Reduction gearsets of the type suitable for use in the drive train are well known to those skilled in the art.

The motor controller 22 may be any microcomputer based controller suitable for providing control commands to the type of motor used. Accelerator pedal 20 responds to operator foot commands in a conventional manner, providing output signals through an actuator for convening pedal position to an electric signal. Preferably, the actuator comprises redundant potentiometers that provide two or more pedal position signals to motor controller 22. This type of accelerator pedal may be easily implemented by those skilled in the art.

Brake controller 66 may be any microprocessor based controller suitable for providing output commands to actuators 114 and 116, rear brakes 48 and 50 and valves 102 and 104 and for receiving input signals from the parking brake switch 68, brake pedal switch 72 and pressure transducers 88, 90, 106 and 108.

The brake pedal 70 may be a conventional brake pedal and switch 72 may be a conventional brake pedal switch of a known type commonly used to turn on rear brake lights (not shown). The master cylinder 78 is a conventional master cylinder with a reservoir 80 connected by hydraulic line 82. The accumulator 92 has expansion chambers on each side allowing accumulation of hydraulic fluid by compression of center spring 91 between two pistons 93. Pressure transducers 88 and 90 may be any suitable type of transducers for providing signals indicative of the pressure in brake lines 86 and 87. Valves 102 and 104 are solenoid valves normally opened and being controllable to isolate hydraulic lines 94 and 96 from lines 40 and 42, respectively, when a command is received through command line 120.

Actuators 114 and 116 may be existing anti-lock brake actuators with the requirement that the actuators be capable to independently provide pressure in hydraulic lines 40 and 42 responsive to commands on line 118. Actuators 114 and 116 are of the type set forth in U.S. Pat. Nos. 4,850,650 and 33,663, both assigned to the assignee of this invention and both having disclosures that are incorporated herein by reference.

Brake calipers 36 and 38 are conventional hydraulic disc brake calipers for use with conventional brake discs 32 and 34. An example of the front brake system is set forth in U.S. patent application, Ser. No. 07/942,015, filed Sep. 8, 1992, and issued as U.S. Pat. No. 5,246,283, assigned to the assignee of this invention, and having a disclosure that is incorporated herein by reference.

Electric brakes 48 and 50 for rear wheels 44 and 46 may be any suitable electric brake. Example electric drum brakes are set forth in U.S. Pat. Nos. 5,000,297 and 5,024,299, both assigned to the assignee of this invention and both having disclosures that are incorporated herein by reference. Examples electric drum brakes are also set forth in U.S. patent application Ser. Nos. 07/963,179, filed Oct. 19, 1992, and issued as U.S. Pat. No. 5,310,026, and 07/720,087, filed Jan. 24, 1991, and issued as U.S. Pat. No. 5,219,049, both assigned to the assignee of this invention and both having disclosures that are incorporated herein by reference.

Speed sensors 28, 30, 52 and 54 are well known to those skilled in the art and may be of the type commonly used in anti-lock brake systems.

The operation of the electric vehicle according to this invention will be described with reference to the following example OPERATING CONDITIONS.

OPERATING CONDITION 1

Assume that accelerator pedal 20 is depressed and brake pedal 70 is not depressed. Routinely, motor controller 22 receives the signal from the brake controller 66 indicating amount of depression, if any, of brake pedal 70. Since, in this operating condition, the brake pedal is not depressed, no brake signal is received.

Accelerator pedal 20 provides a signal to motor controller 22, which responsively develops an acceleration torque command proportional to the amount of operator depression of accelerator pedal 20. Motor controller 22 outputs a command through command lines 16 to inverter 12 responsive to the acceleration torque command. Inverter 12 then provides power to motor 18 from battery pack 10, commanding an output torque for motor 18 responsive to the amount of depression of accelerator pedal 20.

OPERATING CONDITION 2

Assume that accelerator pedal 20 is not depressed and that brake pedal 70 is depressed. When brake pedal 70 is depressed, master cylinder 78 provides hydraulic pressure in hydraulic lines 86 and 87 proportional to the amount of pressure placed on the brake pedal by the foot of the vehicle operator. A brake switch 72 provides a signal through line 76 to brake controller 66 indicating that brake pedal 70 has been depressed. In response to the signal indicating that brake pedal 70 has been depressed, solenoid valves 102 and 104 are commanded via line 120 to close, isolating hydraulic lines 94 and 96 from hydraulic lines 40 and 42. The pressure signals on lines 84 and 85 from pressure transducers 88 and 90 indicate the amount of pressure in hydraulic lines 86 and 87, which is a measure of the pressure applied to the brake pedal 70.

Accumulator 92 has two expandable chambers that expand when fluid pressure on pistons 93 forces center spring 91 to compress. This allows the brake pedal to be depressed in a normal manner when more pressure is applied to the brake pedal, despite the closing of solenoid valves 102 and 104. Without accumulator 92, when solenoid valves 102 and 104 close, travel of the brake pedal 70 would be substantially halted.

Brake controller 66 converts the brake pedal pressure signals on lines 84 and 85 to a brake torque command and provides a request on line 60 to motor controller 22 for regenerative braking. Motor controller 22 continuously runs a routine (i.e., every 100 ms) to determine the amount of regenerative braking capable by monitoring rotational speed of motor 18 and by monitoring the condition of battery pack assembly 10, including the voltage level and current flow. The amount of regenerative braking capable is determined by the amount of power that can be generated by motor 18 at its given rotational speed. The determined amount of regenerative braking capable may be limited by other factors, such as battery voltage conditions, which indicate the amount of power that can be transferred to battery pack 10 without harming the electrical system or battery pack 10, and vehicle speed.

Motor controller 22 then, responsive to the brake regeneration request and the determined regeneration capability, commands power inverter 12 through line 16 to place motor 18 in a regenerative state and transfer energy to battery pack 10. The regenerative state of motor 18 provides braking torque to the vehicle wheels to which motor 18 is connected at a level corresponding to either (a) the determined regenerative braking capability, or (b) the brake torque command, whichever is less.

Motor controller 22 also provides a command on line 62 to brake controller 66 indicating the amount of regenerative brake torque commanded (and assumed to be achieved when open loop control is used). The actual function in the motor controller is to subtract the acceleration torque command from the regenerative brake torque command. However, in this operating condition, the acceleration torque command is zero since the accelerator pedal is not depressed.

Brake controller 66 subtracts the regenerative brake torque achieved from the brake command to determine a torque difference command. Brake controller 66 then outputs the torque difference command through lines 118 to actuators 114 and 116. Actuators 114 and 116 responsively apply pressure to hydraulic lines 40 and 42 proportional to the torque difference command. The hydraulic pressure in lines 40 and 42 responsively forces brake calipers 36 and 38 to apply friction braking to front brake discs 32 and 34 responsive to the torque difference command. Closed loop control of brake pressure applied to the front brakes is monitored via pressure transducers 106 and 108, providing signals to brake controller 66 via lines 107 and 109. Note, if all of the requested braking torque is achieved by the motor regeneration, then no friction braking is applied to the front brakes.

According to the above description of this invention, a desired front brake torque is determined. The front braking torque is achieved as a sum of the regenerative brake torque achieved and the friction brake torque achieved. The distribution of front braking torque between regenerative braking and friction braking is constantly varied responsive to the determined mount of regenerative braking achievable.

Brake controllers 66 also controls rear electric brakes 48 and 50 via line 58. The rear electric brake command is determined as a function of the input brake pressure signal and vehicle speed to provide standard front-rear brake proportioning applicable to all vehicles.

OPERATING CONDITION 3

Assume that both brake pedal 70 and accelerator pedal 20 are depressed, with depression of accelerator pedal 20 commanding more acceleration torque than depression of brake pedal 70 is commanding brake torque. When brake pedal 70 and accelerator pedal 20 are both depressed, the electric vehicle could drive both the motor 18 and the front brakes 32, 34. Driving both systems at the same time, however, requires an expense of power because power is provided both to the motor and the brakes to provide torque in competing directions. Thus, while the power input to the two systems has a magnitude equal to the sum of the magnitudes of the power provided to each system, the motive torque (vehicle speed acceleration or braking) achieved is the difference of the magnitudes of the torque commanded to each system.

The acceleration torque commands and brake torque commands are not blindly applied to the motor and brake systems to generate competing output torques. Instead, the brake torque command determined by brake controller 66 is provided to motor controller 22, which sums the brake torque command and accelerator torque command. (Note: the brake torque command is always negative since brake torque is always commanded in the opposite direction of acceleration torque). If the sum of the brake torque command and the acceleration torque command is positive, which occurs in this example, more acceleration torque is commanded than brake torque is commanded. A command proportional to the resultant sum is provided via line 16 to power inverter 12, which commands motor 18 to provide an output torque equal to the magnitude of acceleration torque minus the magnitude of brake torque.

The command line 62 provides a signal to line 66 indicating the amount of braking torque achieved according to the equation commanded torque minus the acceleration torque command, which in this operating condition, indicates that all braking torque is accounted for in the above torque summation. Responsively, brake controller 66 does not drive the vehicle front brake units. As a design option, the rear brakes may be driven responsive to only the brake pedal signal. Thus while the front brakes are not allowed to compete with the front wheel drive motor 18, the electric rear brakes are. Alternatively, the rear electric brakes may be inhibited when the sum of the acceleration torque and braking torque commands is positive. In this manner, competing vehicle systems do not fight each other and expend energy unnecessarily when both the accelerator pedal and brake pedal are depressed.

OPERATING CONDITION 4

Assume that both accelerator pedal 20 and brake pedal 70 are depressed, with brake pedal 70 commanding more brake torque than accelerator pedal 20 is commanding acceleration torque. Again the brake torque command is provided from brake controller 66 through line 60 to motor controller 22, which sums the accelerator torque command and the brake torque command. In this operating condition, the magnitude of the brake torque command is greater than the magnitude of the accelerator torque command and the resultant sum is negative, indicating that the sum of the commands requires braking. The motor controller 22 then determines the amount of regeneration braking available and applies the a regenerative braking command to inverter 12 responsive to the minimum of (i) the sum of the torque commands and (ii) the regenerative braking torque available. In response, inverter 12 controls motor 18 to provide regenerative braking by generating power and transferring the power to battery pack 10.

The difference between the motor torque command (the regenerative braking command) and the acceleration torque command is determined as the torque achieved signal and provided through line 62 to brake controller 66. Brake controller 66 subtracts from the brake torque command the torque achieved signal to determine the torque difference signal. If the brake difference signal is less than zero (note: all brake torque commands are negative), which is the case of this operating condition, then brake actuators 114 and 116 are activated providing hydraulic brake pressure in hydraulic brake lines 40 and 42 commanding braking at disc brakes 32 and 34 at a torque equal to the torque difference signal. The rear brakes 48 and 50, as described above, are commanded as a function of the brake pedal pressure.

In the above operating examples where braking is applied, a vehicle operator who is a one-footed driver (i.e., controls both the accelerator and brake pedals with one foot) depresses the brake pedal and the vehicle braking response has a similar feel to the operator as conventional hydraulic braking of the type used in internal combustion engine vehicles. While the vehicle operator "feels" conventional braking, the vehicle controls described above are proportioning braking between regenerative braking, in which brake torque is achieved by causing motor 18 to generate power and provide the power to battery pack 10, and friction braking in which the vehicle disc brakes are activated. The electric vehicle continuously changes the proportioning responsive to the vehicle conditions while the vehicle driver feels braking of the vehicle in a manner to which all drivers are accustomed. Further, the two footed driver does not cause the unnecessary consumption of energy that would occur if a drive wheel were driven by the motor while also being braked by the brake. The electric vehicle sums both the brake and the accelerator torque commands and controls the vehicle in response to the sum of the requested torque commands and, when the sum requires braking, blends the regenerative and friction braking.

CONTROL DESCRIPTION

Figure 2:
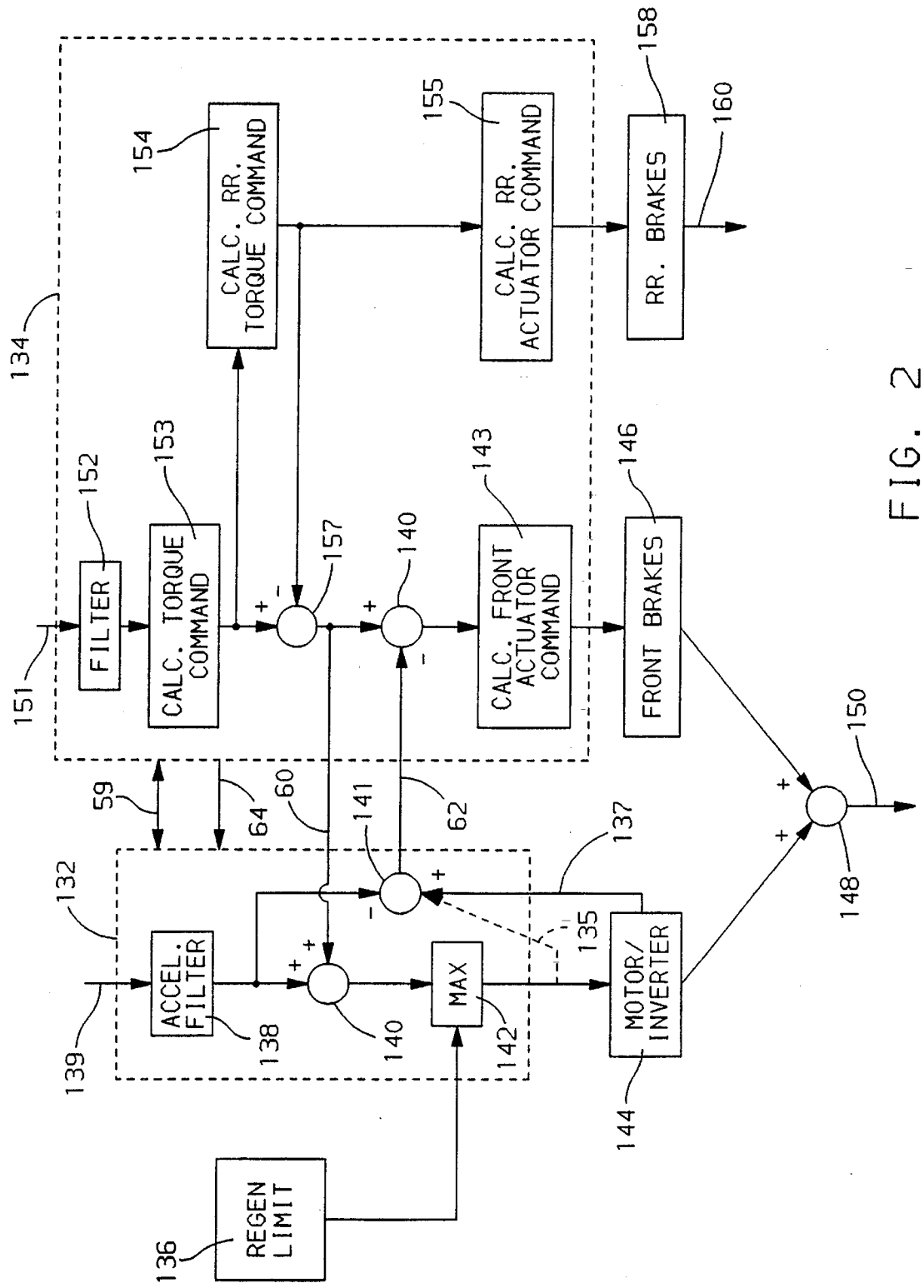
FIG. 2 illustrates the control scheme of this invention.

Referring now to FIG. 2, the control architecture according to this invention comprises propulsion control 132 and brake control 134. Regeneration capability is continuously updated at block 136 in response to the rotational speed of the drive motor.

Propulsion control 132 receives an input represented by line 139 from the accelerator pedal, runs the accelerator pedal input through a low-pass filter 138 to filter out noise and provides the filtered signal as an acceleration torque command to summation block 140 and to summation block 141. A conversion function may be implemented, in the form of a multiplication constant, to convert the actual signal from the accelerator pedal to an acceleration torque command.

Summation block 140 adds the acceleration torque command to the front brake torque command received through line 60, the sum of which is the total torque request that is provided to block 142. When the torque request is positive, indicating that the motor is commanded to provide drive force to the wheels, block 142 limits the command to the maximum limit motor torque request. The resultant torque request command is provided to the motor inverter system 144, which provides motive force to the vehicle front wheels, represented via block 148.

When the torque request is negative, indicating regenerative braking is desired, block 142 limits the regenerative braking to the limit that is determined by block 136, and further in response to battery voltage and, if desired, vehicle speed. The output of block 142 commands the motor inverter system to act as a generator causing regenerative braking to the vehicle front wheels represented as summation block 148.

As an optional implementation, line 137 can be implemented as feedback for motor inverter system 144 to provide feedback as to the actual amount of regenerative braking achieved. This is not necessary as open loop systems have been found to provide high levels of performance. In the open loop implementation, feedback of the motor commands 135 is provided, coupling the output of limiting block 142 to summation block 141. Summation block 141 subtracts the acceleration torque command from the resultant torque request to determine a torque achieved signal and provides the torque achieved signal to brake control 134 via line 62.

A serial data link 59 may be implemented to provide updates to braking subsystem 134 of regeneration limits, as computed by block 136.

Brake control 134 receives an input represented by line 151 from the brake pedal, runs the brake pedal input through a low-pass filter 152 to filter out noise and provides the filtered signal to block 153, which converts the signal, using a multiplication constant, to a brake torque command. The brake torque command is provided to block 154, which determines the rear brake torque command as a function of the brake torque command. Block 155 determines the rear actuator command as a function of the rear brake torque command and applies the rear brake actuator command to the rear drum brakes 158 to achieve rear wheel braking torque represented by line 160.

Block 157 determines the front brake torque command as the difference between the brake torque command and the rear brake torque command and provides the front brake torque command via line 60 to the motor control system 132. Block 140 determines the front friction torque command as a difference between the front brake torque command and torque achieved signal on line 62, which is the amount of brake torque accounted for in summation block 140, when the acceleration torque command and the front brake torque command are summed, and accounted for via regenerative braking, as indicated on line 135 (open loop implementation) or line 137 (closed loop implementation).

Block 143 determines the front actuator commands as a function of the front friction torque command and operates the front disc brakes 146 responsive to the front actuator command to achieve the desired amount of friction braking (if any). The summation of the front disc brakes and regenerative braking is represented by summation block 148 and resultant summation line 150 indicates the torque, either drive or brake, on the front wheels of the vehicle.

In the event of an anti-lock braking condition, brake control 134 implements controls according to known anti-lock braking techniques to achieve anti-lock braking. See, for example, above mentioned U.S. Pat. Nos. 4,850,650 and 33,663. While the above control description is described in general and is not limited to the apparatus shown in FIG. 1, the apparatus shown in FIG. 1 is the preferred implementation thereof.

OPERATION OF TRACTION CONTROL

Figure 3:
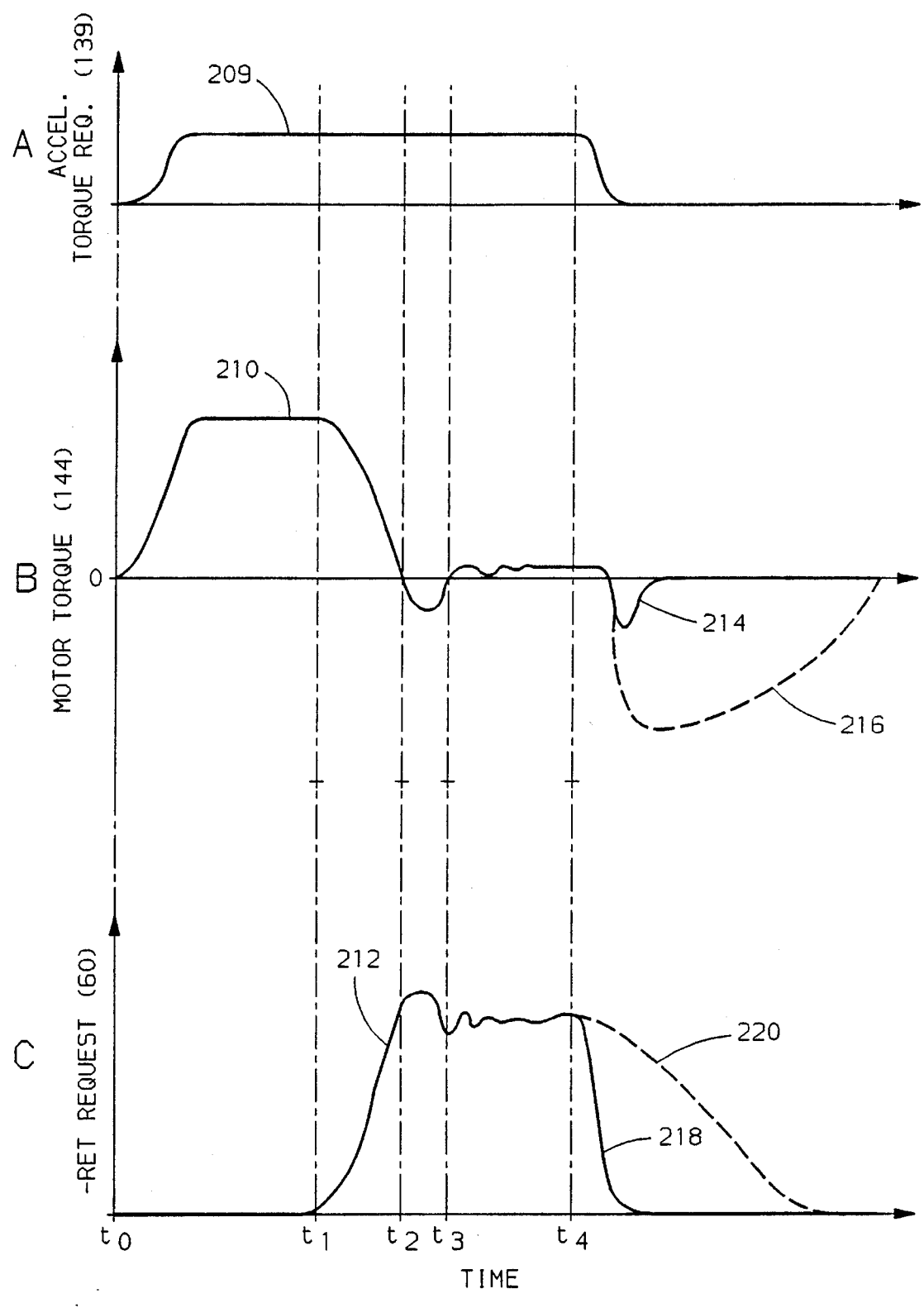
FIG. 3 graphs control commands and motor response according to this invention.

Referring now to FIG. 3, the traces 210 and 212 show motor torque and retard request, respectively, in an example traction control operation according to this invention. In the example illustrated, it is assumed that the vehicle accelerator pedal is depressed, causing motor torque 210 to increase beginning at the time $t_0$. Because there is no braking requested and because traction control is not yet activated at time $t_0$, the retard request signal remains at zero. At time $t_1$, assume the vehicle hits a low coefficient of friction surface such as ice, which causes the drive wheels to spin at a faster rate than the non-drive wheels, causing the vehicle to enter traction control mode.

In response to the detected traction control event at time $t_1$, the brake control unit increases the retard request signal 212 as shown between times $t_1$ and $t_2$. Referring again also to FIG. 2, this is the signal on line 60 that is added to the acceleration signal at block 140 and since the retard request signal is always negative, it reduces the value of the acceleration signal. Thus, the drive motor and inverter 144 are commanded to lower torques as shown by the reducing motor torque signal, line 210, between times $t_1$ and $t_2$. In this example, it is assumed that the wheel slip is relatively large and that active braking is desired to achieve fast response slowing the drive wheels to achieve a high performance traction control.

Because the drive train includes a motor and reduction gear set with no clutches attached to the drive shaft and drive wheel, it contains a significant level of inertia which, itself, tends to maintain the whole drive train rotating providing forward torque for the vehicle. To increase the responsiveness of the system, the retard request at time $t_2$ is allowed to go to a level greater than the requested acceleration torque, thus resulting at block 140 (FIG. 2) in a summation with an overall negative torque request. This negative torque request, shown by trace 210, between times $t_2$ and $t_3$ is interpreted by the motor inverter 144 as a request for regenerative braking. Thus, braking in the traction control system is provided by regenerative braking, allowing the system to have a fast torque response to the detected wheel slip.

Even though the motor torque is negative between times $t_2$ and $t_3$, that is, the motor is not drawing any power from the battery but is, in fact, supplying power to the battery, there is still forward drive torque provided by the vehicle wheel against the road due to the stored kinetic energy in the inertia of the rotating motor and drive train. In this manner, this invention deviates from previously known traction control techniques in that no energy is supplied to the prime mover, that is, the vehicle's electric motor, to maintain at least some level of positive drive torque on a vehicle wheel. Instead, this positive drive torque is obtained, during the period between time $t_2$ and $t_3$ from stored energy in the inertia of the motor and drive train.

Between times $t_3$ and $t_4$, the control system, for example, a PID controller, settles into a mode where the motor provides a small level of positive drive torque as shown by trace 210, from power received from the battery. The level of torque settles at a level providing positive drive torque between the wheel and road while maintaining wheel slip below a threshold level.

Assume at time $t_4$ that the accelerator pedal is suddenly released causing the requested accelerator torque to rapidly decrease to zero. The decrease in requested accelerator torque is not instantaneous because the signal is filtered at block 138 (FIG. 2). Responsive to the sudden release of the accelerator pedal, according to this invention, one of two modes controls the retard request signal.

A first response, according to this invention, is represented by traces 214 and 218 and occurs when the detected wheel speed differential or wheel slip is small. The motor torque signal 210 is the summation result of signals 209 and 212. If 209, the accelerating torque request signal, suddenly decreases, the signal 210 becomes dominated by the signal 212 and the motor torque signal 210 goes suddenly negative, as shown following time $t_4$. If the wheel slip differential is relatively small, this sudden negative torque provided by the motor, responsive to trace 210, could cause a sudden braking of the vehicle for a short time period due to regenerative braking. This braking could be as much as 0.3 g. To prevent this, when the wheel speed differential is small and the accelerator pedal request signal ramps to zero after time $T_4$, the retard request signal is quickly ramped-out, as shown by trace 218. The ramp-out time for trace 218 is approximately 500 milliseconds and causes a resultant motor torque signal, as shown by trace 214, which goes negative for a short while to compensate for any wheel speed slip differential, but not enough to cause any sudden braking of the vehicle that would be perceived by the vehicle operator.

If the wheel speed differential is large, or greater than a predetermined threshold at the time $t_4$ when the accelerator pedal torque request goes to zero, the retard request is ramped-out at a slower rate, as shown by trace 220, providing a ramp-out time of approximately 2 seconds. This slower rate of ramp-out causes the motor torque signal to ramp negative for the ramp-out time shown by trace 216. Although this ramp-out time with a negative motor torque request, as shown by trace 216, remains negative for as long as 2 seconds, the negative torque is canceled out by the positive drive torque provided by the stored energy in the inertia of the motor and drive system and thus, again, no untimely braking motion is felt by the vehicle.

Thus, according to this invention as can be seen by the above operation, transfer from traction control to non-traction control events, which are marked by the time period $t_4$, occur in two modes of operation. The first mode occurs when the wheel speed differential at the time of the accelerator pedal release is small and provides a quick ramp-out of the retard request signal, preventing motor torque from going significantly below zero for a significant time. The second mode of operation, when the wheel speed differential is greater than a predetermined threshold, provides the slower time constant time ramp-out of the retard request signal, allowing the motor torque to go negative, canceling out inertial affects of the motor and drive train.

Figure 4:
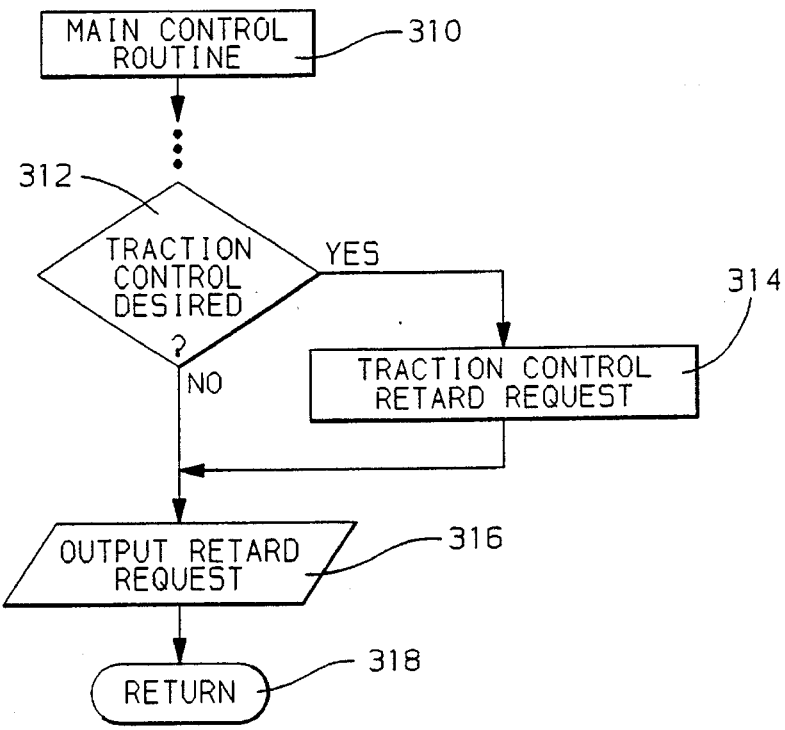
FIG. 4 illustrates a main flow routine for a microcomputer implementation of the electric vehicle traction control according to this invention.

Referring now to FIG. 4, a portion of the main control routine for the brake control is shown including the traction control according to this invention. Block 310, in general, represents the control functions described above with reference to FIG. 2 for the brake controller including determination of a retard request signal responsive to an operator depressing the brake pedal. Any other routine desired to be implemented in the brake controller may be implemented and controlled by the main control routine, block 310.

Referring now to block 312, the controller determines if activation of the traction control is desired. If activation of traction control is desired, the routine moves to block 314 where the traction control determines the retard request responsive to the detected traction control condition. The routine then continues to block 316 where the retard request is output to the motor control unit 132, FIG. 2. Operation of blocks 312 and 314 is explained in more detail below with reference to FIGS. 5A, 5B and 5C.

The retard request signal output at block 316 affects the motor controller, as described above with reference to FIG. 2. More particularly, the magnitude of the retard request signal is subtracted from the acceleration signal. If the resultant summation signal is positive, it provides a positive torque drive signal to the motor and if the resultant summation signal is negative, it provides a negative signal to the motor commanding regenerative braking proportional to the magnitude of the negative signal.

Figure 5A:
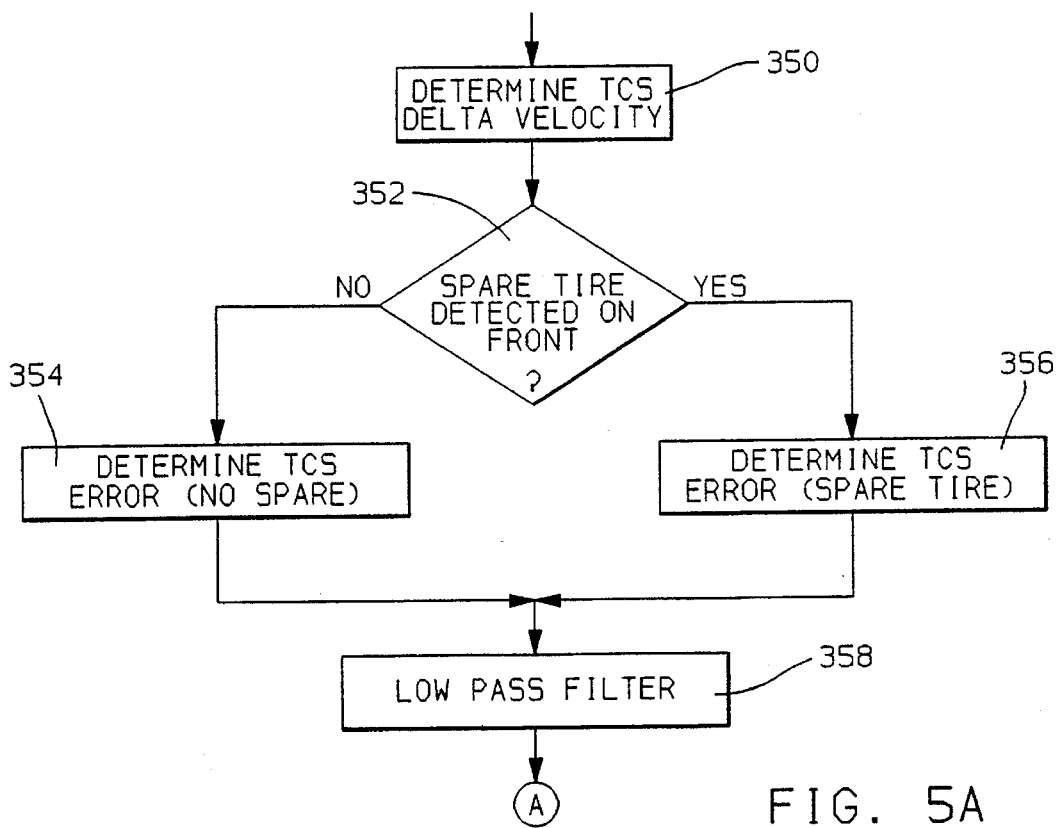
FIGS. 5A, 5B and 5C illustrate a detailed flow routine of the electric vehicle traction control according to this invention.
Figure 5B:
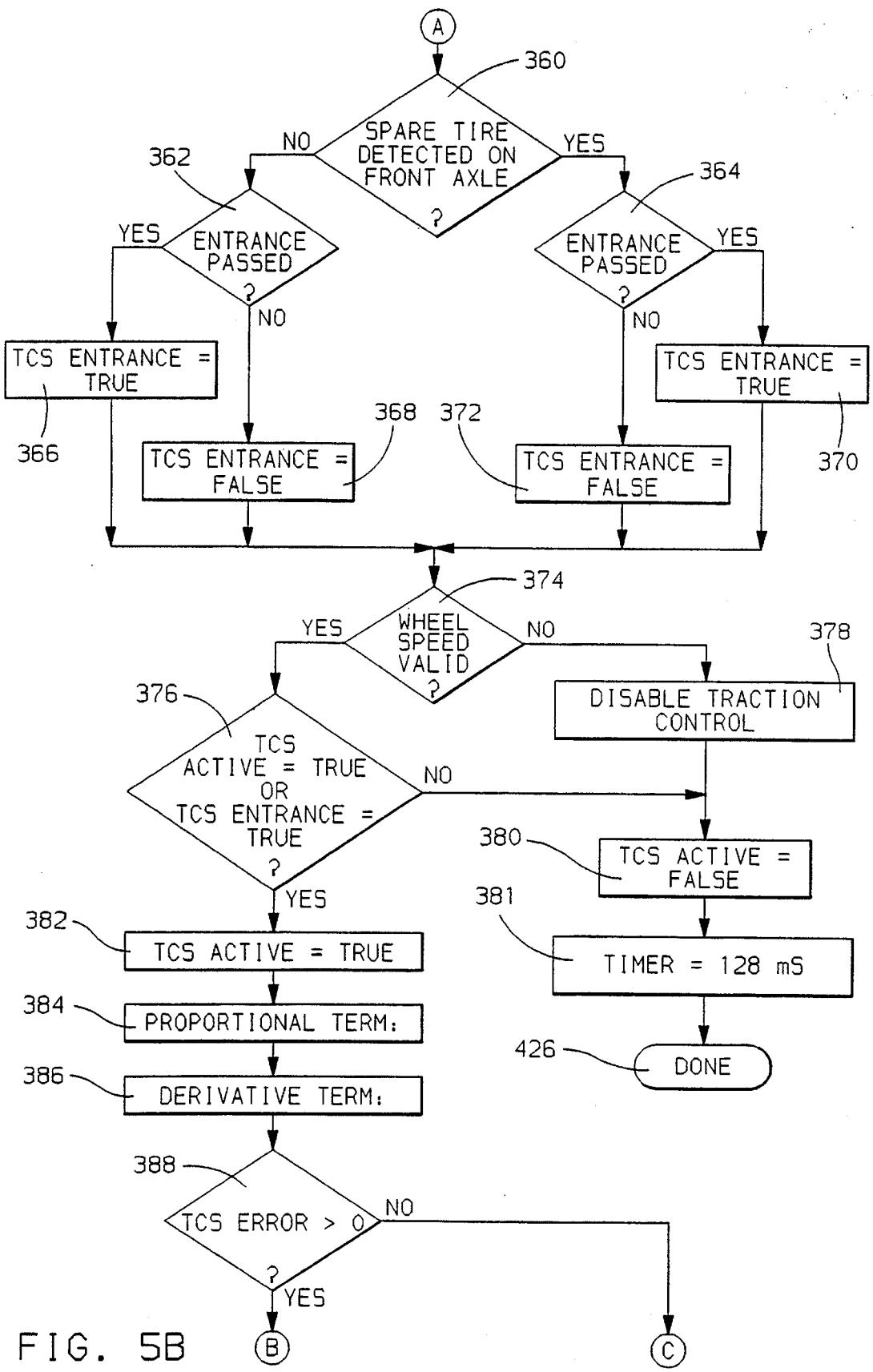
Figure 5C:
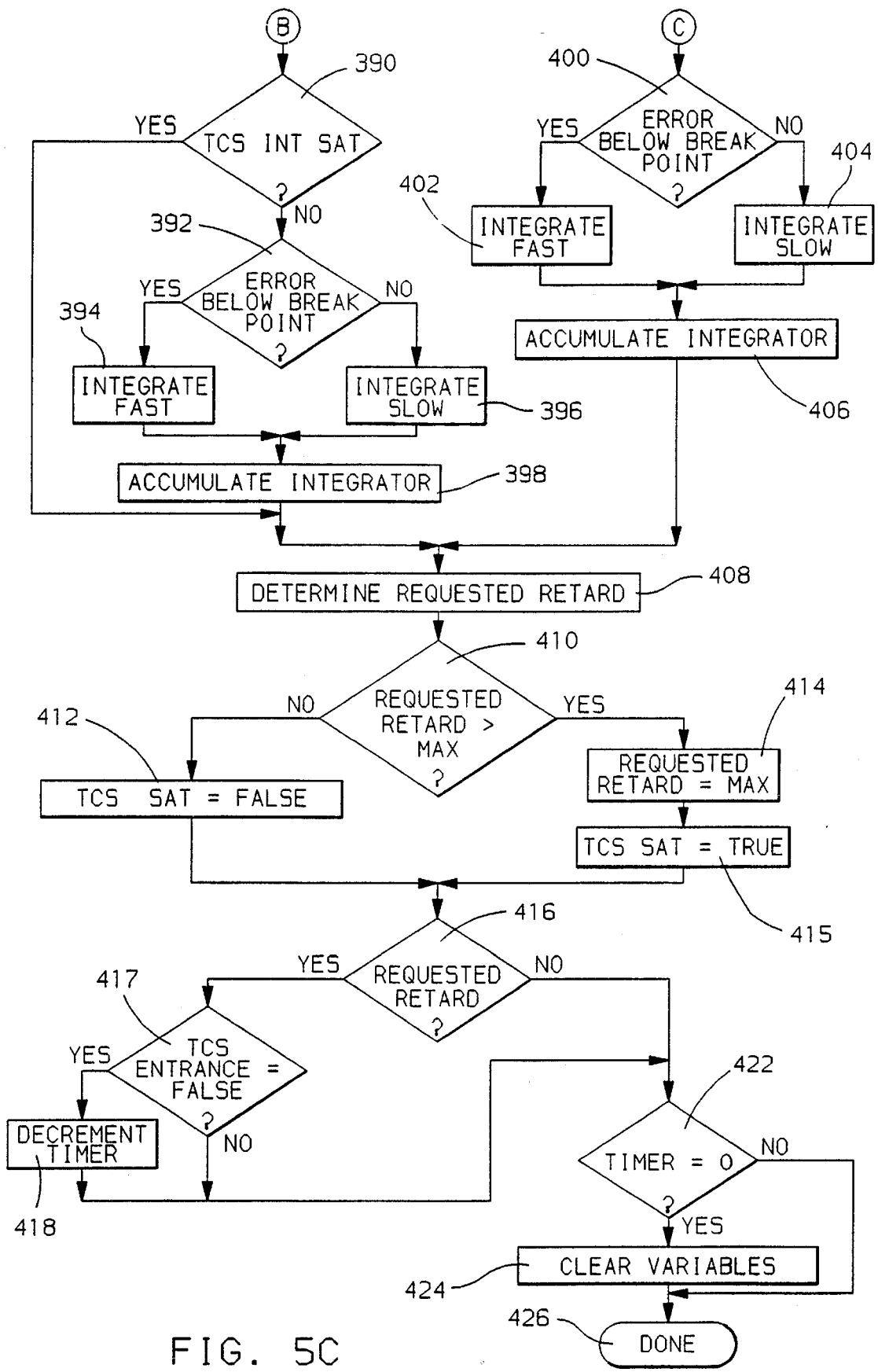

Referring now to FIGS. 5A, 5B and 5C, the determination of whether it is desired for the vehicle to be in traction control mode begins at block 350. At block 350, the routine determines a value TCS DELTA VELOCITY, according to the equation:

TCS DELTA VELOCITY=[LEFT FRONT WHEEL SPEED–

LEFT REAR WHEEL SPEED+RIGHT FRONT WHEEL SPEED–

LEFT REAR WHEEL SPEED]/2, where the wheel speed values used are filtered values. The value TCS DELTA VELOCITY represents the average spin between the front and rear wheels, which is the average angular velocity difference between the front and rear wheels. The routine then moves to block 352 where it detects whether there is a spare tire on the vehicle front axle. Spare tire detection algorithms based on a determined wheel speed difference of one wheel, which is greater than the others in a steady state condition, are known to those skilled in the art. If block 352 detects a spare tire on one of the front axles of the vehicle, appropriate flags are set and the routine moves to block 356 where it sets the value TCS ERROR according to the equation:

TCS ERROR=TCS DELTA VELOCITY–SPARE TARGET SPIN, where SPARE TARGET SPIN is a predetermined constant used when a spare is detected on the front axle and sets the desired spin threshold for traction control activation in situations with a spare tire on either of the front wheels. An example value for SPARE TARGET SPIN may be 5 m.p.h. The value TCS ERROR may be defined as the unfiltered difference between the actual wheel spin and desired wheel spin where wheel spin represents the average velocity difference between the front and rear tires.

If at block 352, no spare tire is detected, the routine moves to block 354 where the value TCS ERROR is determined according to the equation:

TCS ERROR=TCS DELTA VELOCITY–NORMAL TARGET SPIN, where NORMAL TARGET SPIN sets the spin threshold level for traction control activation during normal or no-spare operating condition. The routine then moves to block 358 where the value TCS ERROR is filtered through a low-pass filter. The filter operates according to the following two equations:

TCS FILTER ERROR OLD=TCS FILTER ERROR and

TCS FILTER ERROR=TCS ERROR * (1–FILTER GAIN)+

TCS FILTER ERROR OLD * FILTER GAIN where TCS FILTER ERROR old is the previously determined filter error and where FILTER GAIN determines the gain of the filter.

Next, at block 360, the routine again checks to determine if there is a spare tire on one of the front two wheels by checking the same flags set at block 352 above. If there is no spare tire, the routine moves to block 362 to proceed with checking normal entrance criteria for traction control activation. At block 362, the routine checks to determine if TCS DELTA VELOCITY is greater than a value ENTRANCE, which is the spin threshold value that causes the traction control system to become active in normal operation. If TCS DELTA VELOCITY is greater than ENTRANCE and the vehicle speed is less than MAXIMUM SPEED, which is the vehicle speed above which traction control is prohibited from becoming activated, then the entrance conditions are met at block 362 and the routine moves to block 366 where it sets the flag TCS ENTRANCE to "True." If the entrance conditions are not met at block 362, the routine moves to block 368 where it sets the flag TCS ENTRANCE to "False."

If, at block 360, it was determined that a spare tire is on the vehicle, the routine moves to block 364 where it performs the traction control entrance test for the vehicle when there is a spare tire on one of the front axles. Block 364 checks to determine if TCS DELTA VELOCITY is greater than a predetermined value ENTRANCE SPARE, which is the spin threshold that causes the traction control to become active with a spare tire detected on the front axle.

If TCS DELTA VELOCITY is greater than ENTRANCE SPARE and if the vehicle speed is less than MAXIMUM SPEED, the entrance criteria for entering traction control when a spare tire is on one of the front wheels is met and the routine moves to block 370 where the flag, TCS ENTRANCE, is set to "True." If the test is failed at block 364, the routine moves to block 372 where the flag TCS ENTRANCE is set to "False." In this example, vehicle speed above which traction control cannot be entered is 40 m.p.h., but the range can be quite large. Other examples used have been as high as 80 m.p.h..

Thus blocks 352–356 and blocks 360–372 control both the regulation slip speed (referred to above as NORMAL TARGET SPIN and ENTRANCE TARGET SPIN) and entrance criteria for the traction control according to this invention so that in normal mode and spare tire mode, the entrance criteria and regulation slip speed are adjusted accordingly.

For example, the entrance criteria and regulation slip speed may be set according to the following table:

|  | Normal | Spare |
| --- | --- | --- |
| Entrance | 3 mph | 7 mph |
| Target Spin | 2 mph | 5 mph |

The routine then moves to block 374 where it checks diagnostic flags that have been set from standard diagnostic routines of the wheel speed signals and sets a flag, WHEEL SPEED VALID responsive to the diagnostic check. If an electrical problem is detected with any of the four wheel speed sensors, such an open circuit or a short circuit, WHEEL SPEED VALID flag is set to false. Also, if a mechanical problem is detected with any of the four sensors, for example, three of the wheel speeds detect rotational velocities of greater than 7 m.p.h. for longer than 10 seconds while the fourth wheel speed remains at zero, then it is assumed that there is a mechanical problem with the fourth sensor and the WHEEL SPEED VALID flag is set to "False." These tests can be easily implemented by those skilled in the art and are known for use in vehicles with wheel speed sensors for traction control and/or ABS systems.

If the WHEEL SPEED VALID flag is set to "False" at block 374, the routine moves to block 378 where the traction control is disabled by setting a flag, TCS ACTIVE, to "False." From block 378, the traction control routine exits at block 426. If the tests at blocks 374 are passed, the WHEEL SPEED VALID flag is set to true and the routine continues to block 376. At block 376, the routine checks two flags, TCS ACTIVE and TCS ENTRANCE. If neither flag is "True," the routine moves to block 380 where it sets the TCS ACTIVE flag to "False," moves to block 381 where the TIMER is reset and exits at block 426. If either flag is "True," the routine moves to block 382 where it sets the TCS ACTIVE flag to "True."

Setting of the TCS ACTIVE flag to true at block 382 causes a low traction tell-tale on the instrumentation display to illuminate after a one second delay. The one second delay avoids flashing of the light which could occur if traction control is quickly entered and then exited.

The routine then continues to block 384 where it begins to determine the traction control retard request. At block 384, the proportional term of the traction control retard request is determined as follows:

PROPORTIONAL TERM=PROPORTIONAL GAIN * TCS FILTER ERROR/16, where PROPORTIONAL GAIN is a predetermined constant, TCS FILTER ERROR is the value determined at block 358 above and the value 16 is simply a conversion constant. The routine then moves to block 386 where the derivative term of the retard request is determined according to the equation:

DERIVATIVE TERM=DERIVATIVE GAIN * (TCS FILTER ERROR–

TCS FILTER ERROR OLD)/128, where the values TCS FILTER ERROR and TCS FILTER ERROR OLD were determined at block 358 above, where DERIVATIVE GAIN is a predetermined constant and where 128 is a conversion constant.

At block 388, the routine checks to determine if the value TCS ERROR is greater than zero. If so, the routine moves to block 390 where it checks to determine if the integrator is saturated. If the integrator term is saturated, that is, has met a predetermined maximum level, then the integral term is not updated and the routine continues to block 408. If the integrator is not saturated, then the routine continues to block 392 where it compares the value TCS ERROR to a predetermined constant INTEGRATOR BREAK POINT. When the TCS ERROR is below the value INTEGRATOR BREAK POINT, a higher gain for the integrator is selected. This allows the integrator to exit fast when the wheels have recovered, allowing the fast exit from traction control according to this invention. Using the normal integrator gain would impose a delay of 1–2 seconds in exiting traction control after the wheel spin has been reduced to zero.

If, at block 392 the TCS ERROR is less than INTEGRATOR BREAK POINT, the routine moves to block 394 where a value INTEGRATOR UPDATE is determined according to the equation:

INTEGRATOR UPDATE=FAST INTEGRATOR GAIN * TCS ERROR/256, where FAST INTEGRATOR GAIN is the gain value for the integral term of the traction control loop when the error is less than INTEGRATOR BREAK POINT and where the term INTEGRATOR UPDATE is the update value for the integral term of the PID control loop. This term is set relatively high to allow the traction control to exit quickly once adequate traction is achieved. If, at block 392, the value TCS ERROR is not less than the INTEGRATOR BREAK POINT, then the routine moves to block 396 where it determines the value INTEGRATOR UPDATE according to the equation:

INTEGRATOR UPDATE=SLOW INTEGRATOR GAIN * TCS ERROR/256, where SLOW INTEGRATOR GAIN is the gain value for the integral term of the traction control system control loop when the error is large, that is, the spin is greater than a predetermined threshold level. The SLOW INTEGRATOR GAIN is set relatively low for stability. The routine then moves to block 398 where it updates the integral term of the PID controller according to the equation:

INTEGRAL TERM=INTEGRAL TERM+INTEGRATOR UPDATE

If at block 388, the value TCS ERROR was not greater than zero, then the routine moves to block 400. At block 400, the value TCS ERROR is compared to the value INTEGRATOR BREAK POINT and if it is less than the INTEGRATOR BREAK POINT, then the routine moves to block 402 where the integral term is determined according to the equation:
INTEGRATOR UPDATE=FAST INTEGRATOR GAIN * TCS ERROR/256.
If the test at block 400 is failed, the routine moves to block 404 where the integral update term is determined according to the equation:
INTEGRATOR UPDATE=SLOW INTEGRATOR GAIN * TCS ERROR/256.

The routine moves then to block 406 where it determines the integral term of the PID control command according to the equation:

INTEGRAL TERM=INTEGRAL TERM+INTEGRATOR UPDATE

The lowest value for INTEGRAL TERM is limited to zero.

The routine then continues to block 408 where it sets the command REQUESTED RETARD equal to the sum of the above-determined PROPORTIONAL TERM, INTEGRAL TERM and DERIVATIVE TERM. The routine then moves to block 410 where it compares the REQUESTED RETARD value to a maximum value. The maximum retard value is the maximum value of retard that will be requested by the traction control system. If this value is set to less than the maximum motor torque that can be requested by the accelerator pedal, it allows depression of the accelerator pedal to full throttle to partially override the traction control system. Thus, an operator of the vehicle can have traction control in normal driving and can override traction control by simply depressing the accelerator pedal to full throttle. Alternatively, the maximum retard is set to a value equal to or greater than the maximum motor torque that can be requested by an accelerator pedal input. In which case, the operator is not allowed to override the traction control. If REQUESTED RETARD is greater than the maximum value, the routine moves to block 414, where it limits the REQUESTED RETARD to the maximum value and sets the flag TCS INTEGRATOR SATURATED to "True."

If, at block 410, the REQUESTED RETARD was not greater than the maximum allowed, then the routine moves to block 412 where the flag TCS INTEGRATOR SATURATED is set to "False." This flag controls saturation tests at block 390 above. The routine then continues to block 416 where it determines if the REQUESTED RETARD is zero and if the flagged TCS ENTRANCE is "False" (block 417). If both conditions are "True," the routine moves to block 418 where a value TIMER is decremented. The routine then continues to block 422 where the value TIMER is compared to zero. If the value TIMER is not equal to zero, the routine moves to block 426 where it exits. If, at block 422, TIMER is equal to zero, the routine moves to block 424 where the traction control variables are reset, effectively causing an exit of the traction control. The routine then moves to block 426. The value TIMER controls a 128 millisecond ramp-out of traction control when either the entrance test fails and the REQUESTED RETARD returns to zero.

As can be seen in the above description of the traction control, according to this invention, a PID control loop is used to determine a REQUESTED RETARD responsive to wheel spin, to provide a traction control system for the vehicle. The REQUESTED RETARD is not limited to a value which would limit the overall motor torque to a minimum positive value, such as occurs in internal combustion engine implementations of traction control. Instead, the retard request is allowed to obtain values greater than the requested acceleration of the motor allowing the traction control system to send the motor into a state of regeneration to force quick response of the motor by braking the motor and relying on inertia in the motor and drive system, such as the reduction gear of the transmission, to provide positive drive torque for the wheels during traction control.

Also, as can be seen above, at blocks 352–356 and 360–372, the traction control system according to this invention sets traction control entrance criteria and target spin responsive to a detected presence of the spare tire on one of the front wheels, which are the drive wheels in a front-wheel-drive vehicle. In a rear-wheel-drive vehicle, the test would be for the rear wheels. If a spare tire is present, this invention prevents activation of the traction control by setting a higher entrance slip speed and regulates the traction control to a higher spin speed.

Additionally, blocks 388, 392 and 400 force a fast exit or a slow exit of traction control depending upon whether the detected slip is less than a predetermined constant. That is, if the detected spin is small, there is a quick exit from traction control provided by a fast response integral term and when the spin is large, a slower response integral term is provided to maintain better control of the system.

It will be recognized by those skilled in the an that the invention described above is contrasted to other known types of traction control systems that are able to accomplish prime mover torque reduction and wheel braking in that herebefore, in such systems, it was known to develop at least two command signals, a command signal to the prime mover and a command signal to the brake system. As those skilled in the art will recognize from the above description, the traction control system according to this invention controls both the torque reduction to the prime mover and the brake command with a single signal and is embodied in the apparatus comprising: an electric motor and drive system for an electric vehicle; at least one driven wheel mechanically connected to the electric motor and drive system; at least one non-driven wheel; a controller for controlling the motor and drive system to provide traction control for the vehicle comprising (i) means for sensing a positive wheel slip between the driven and non-driven wheel; (ii) means for determining a control command responsive to the sensed slip; (iii) means for applying the control command to the motor and drive system to affect positive motor drive torque from the motor when the control command is less than an acceleration request; (iv) means for applying the control command to the motor and drive system to affect regenerative braking when the control command is less than an acceleration request, wherein during regenerative braking, positive tractive force is provided by inertia of the motor and drive system, wherein the single control command controls both motor torque and braking during traction control.

The above-described traction control implementation of this invention is an example implementation. Moreover, various modifications to this invention may occur to those skilled in the art and will fall within the scope of this invention as set forth below.

The embodiments of the invention in which an exclusive property or privilege is claimed are:

1. A vehicle traction control system comprising:

an electric motor and drive system for an electric vehicle;

an accelerator pedal for providing an acceleration request;

at least one driven wheel mechanically connected to the electric motor and drive system;

at least one non-driven wheel; and a controller coupled to the driven wheel, the non-driven wheel and the motor for controlling the motor and drive system to provide a traction control for the vehicle comprising (i) means for sensing a positive wheel slip between the driven and non-driven wheels when the electric vehicle is accelerating in response to the acceleration request to increase a road speed; (ii) means for determining a control command responsive to the sensed slip; (iii) means for applying the control command to the motor and drive system to affect a positive motor drive torque from the motor when the control command is less than the acceleration request; (iv) means for applying the control command to the motor and drive system to affect regenerative braking when the control command is greater than the acceleration request, wherein regenerative braking occurs when the vehicle is accelerating to increase the road speed, wherein during regenerative braking, positive tractive force is provided by an inertia of the electric motor and drive system, wherein the control command controls both the positive motor drive torque and braking during the traction control.

2. In a vehicle with an electric motor and a drive system, an accelerator pedal, and a first wheel mechanically connected to the electric motor and drive system, wherein the motor provides motor torque, wherein the motor torque is positive during a first set of time periods, providing positive output torque and negative during a second set of time periods, providing negative output torque, wherein the positive output torque causes a vehicle acceleration and wherein the negative output torque causes a regenerative braking, a method traction control comprising the steps of:

sensing positive wheel slip between the first wheel and a second wheel when the electric vehicle is accelerating in response to an acceleration request from the accelerator pedal to increase a road speed;

determining a control command responsive to the sensed slip;

applying the control command to the motor and the drive system to affect the positive output torque from the motor when the control command is less than the acceleration request;

applying the control command to the motor and drive system to affect the regenerative braking when the control command is greater than the acceleration request, wherein the regenerative braking occurs when the vehicle is accelerating to increase the road speed, wherein during the regenerative braking, a positive tractive force is provided by an inertia of the motor and the drive system to accelerate the vehicle to increase road speed, wherein the control command controls both the positive motor drive torque and the regenerative braking during a traction control.

3. A method of traction control according to claim 2, also comprising the steps of:

sensing an operator release of the accelerator pedal;

if the release of the accelerator pedal occurs during the traction control and if the sensed slip is less than a predetermined threshold, ramping the control command to zero at a first rate;

if the release of the accelerator pedal occurs during the traction control and if the sensed slip is greater than the predetermined threshold, ramping the control command to zero at a second rate, wherein the first rate is greater than the second rate, wherein during the ramping of the control command at the first rate, the motor torque is prevented from being the negative for greater than a first time period and wherein during the ramping of the control command at the second rate, the motor torque is allowed to go below zero for greater than the first time period, wherein the negative output torque when the motor torque is allowed to go below zero counters inertial affects of the motor and drive train.

* * * * *